US011655333B2

(12) United States Patent
Sookraj

(10) Patent No.: US 11,655,333 B2
(45) Date of Patent: *May 23, 2023

(54) BETA-PROPIOLACTONE BASED COPOLYMERS CONTAINING BIOGENIC CARBON, METHODS FOR THEIR PRODUCTION AND USES THEREOF

(71) Applicant: Novomer, Inc., Rochester, NY (US)

(72) Inventor: Sadesh H. Sookraj, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 421 days.

This patent is subject to a terminal disclaimer.

(21) Appl. No.: 16/869,080

(22) Filed: May 7, 2020

(65) Prior Publication Data

US 2020/0262973 A1  Aug. 20, 2020

Related U.S. Application Data

(60) Continuation of application No. 16/178,214, filed on Nov. 1, 2018, now Pat. No. 10,669,373, which is a division of application No. 15/369,764, filed on Dec. 5, 2016, now Pat. No. 10,144,802.

(51) Int. Cl.
*C08G 63/08* (2006.01)
*C08G 63/664* (2006.01)
*C08G 63/688* (2006.01)

(52) U.S. Cl.
CPC ........... *C08G 63/664* (2013.01); *C08G 63/08* (2013.01); *C08G 63/6882* (2013.01)

(58) Field of Classification Search
CPC .... C08G 63/00; C08G 63/6852; C08G 63/08; C08G 63/664; C08F 290/061; C08L 67/04; C09J 167/04
See application file for complete search history.

(56) References Cited

U.S. PATENT DOCUMENTS

| | | |
|---|---|---|
| 3,169,945 A | 2/1965 | Hostettler |
| 3,579,489 A | 5/1971 | Wagner |
| 3,607,841 A | 9/1971 | Nakahara et al. |
| 3,678,069 A | 7/1972 | Busler |
| 4,529,788 A * | 7/1985 | Asami ............... C08G 63/00 536/63 |
| 5,310,948 A | 5/1994 | Drent et al. |
| 5,349,046 A | 9/1994 | Beshouri et al. |
| 5,359,081 A | 10/1994 | Drent et al. |
| 5,648,452 A | 7/1997 | Schechtman et al. |
| 6,133,402 A | 10/2000 | Coates et al. |
| 6,258,869 B1 | 7/2001 | Shah et al. |
| 6,316,590 B1 | 11/2001 | Coates et al. |
| 6,538,101 B2 | 3/2003 | Coates et al. |
| 6,608,170 B1 | 8/2003 | Coates |
| 6,852,865 B2 | 2/2005 | Coates et al. |
| 7,420,064 B2 | 9/2008 | Luinstra et al. |
| 8,445,703 B2 | 5/2013 | Allen et al. |
| 8,796,475 B2 | 8/2014 | Allen et al. |
| 9,096,510 B2 | 8/2015 | Porcelli et al. |
| 9,156,803 B2 | 10/2015 | Allen et al. |
| 9,206,144 B2 | 12/2015 | Allen et al. |
| 9,327,280 B2 | 5/2016 | Lee et al. |
| 9,403,788 B2 | 8/2016 | Lee et al. |
| 9,493,391 B2 | 11/2016 | Allen et al. |
| 9,719,037 B2 | 8/2017 | Sookraj |
| 9,738,784 B2 | 8/2017 | Allen et al. |
| 9,914,689 B2 | 3/2018 | Porcelli et al. |
| 10,065,914 B1 | 9/2018 | Ruhl et al. |
| 10,099,988 B2 | 10/2018 | Farmer et al. |
| 10,099,989 B2 | 10/2018 | Sookraj |
| 10,144,802 B2 | 12/2018 | Sookraj |
| 10,221,150 B2 | 3/2019 | Farmer et al. |
| 10,221,278 B2 | 3/2019 | Lee et al. |
| 10,245,559 B2 | 4/2019 | Lapointe et al. |
| 10,669,373 B2 * | 6/2020 | Sookraj ............. C08G 63/6882 |
| 2003/0100655 A1 | 5/2003 | Nair et al. |
| 2004/0068059 A1 * | 4/2004 | Katayama ............ C08L 75/06 525/466 |
| 2005/0014977 A1 | 1/2005 | Drent et al. |
| 2007/0161806 A1 | 7/2007 | Preishuber-Pflugl et al. |
| 2008/0194774 A1 | 8/2008 | Kimura et al. |
| 2010/0196431 A1 | 8/2010 | Watanabe et al. |
| 2012/0123137 A1 | 5/2012 | Allen et al. |
| 2013/0165670 A1 | 6/2013 | Allen et al. |
| 2013/0209775 A1 | 8/2013 | Allen et al. |
| 2013/0281715 A1 | 10/2013 | Allen et al. |
| 2014/0275575 A1 | 9/2014 | Allen et al. |
| 2014/0296522 A1 | 10/2014 | Lee et al. |

(Continued)

FOREIGN PATENT DOCUMENTS

EP 2842583 A1 3/2015
WO 2010/118128 A1 10/2010

(Continued)

OTHER PUBLICATIONS

<http://www.pmahome.org/files/1414/3206/2975/Novomer.pdf> published on May 7, 2013.
Agostini et al., "Synthesis and Characterization of Poly-l3-Hydroxybutyrate. I. Synthesis of Crystalline DL-Poly-l3-Hydroxybutyrate from DL-l3-Butyrolactone", Journal of Polymer Science, Part A-1, vol. 9, No. 10, 1971, pp. 2775-2787.
Billingham et al., "Polymerization and Copolymerization of l3-Butyrolactone by Aluminum Compounds", Journal of Organometallic Chemistry, vol. 341, No. 1-3, 1988, pp. 83-89.
Gross et al., "Polymerization of l3-Monosubstituted-l3-Propiolactones using Trialkylaluminum-Water Catalytic Systems and Polymer Characterization", Macromolecules, vol. 21, No. 9, 1988, pp. 2657-2668.
Hori et al., "Ring-Opening Polymerization of Optically Active l3-Butyrolactone using Distannoxane Catalysts: Synthesis of High-Molecular-Weight Poly (3-Hydroxybutyrate)", Macromolecules, vol. 26, No. 20, 1993, pp. 5533-5534.

(Continued)

*Primary Examiner* — Gregory Listvoyb
(74) *Attorney, Agent, or Firm* — Young Basile Hanlon & MacFarlane, P.C.

(57) ABSTRACT

Provided herein are methods and systems for producing biodegradable beta-propiolactone-based polyester polymers from renewable EO and CO on an industrial scale.

18 Claims, No Drawings

(56) References Cited

U.S. PATENT DOCUMENTS

| | | |
|---|---|---|
| 2014/0309399 A1 | 10/2014 | Porcelli et al. |
| 2015/0005513 A1 | 1/2015 | Lee et al. |
| 2015/0141693 A1 | 5/2015 | Allen et al. |
| 2015/0299083 A1 | 10/2015 | Porcelli et al. |
| 2015/0368394 A1 | 12/2015 | Allen |
| 2016/0016876 A1 | 1/2016 | Mahoney |
| 2016/0102040 A1 | 4/2016 | Allen et al. |
| 2016/0102068 A1 | 4/2016 | Allen et al. |
| 2016/0288057 A1 | 10/2016 | Lapointe et al. |
| 2017/0001940 A1 | 1/2017 | Sookraj |
| 2017/0029352 A1 | 2/2017 | Sookraj et al. |
| 2017/0073463 A1 | 3/2017 | Lee et al. |
| 2017/0080409 A1 | 3/2017 | Farmer et al. |
| 2017/0096407 A1 | 4/2017 | Sookraj |
| 2017/0107103 A1 | 4/2017 | Sookraj et al. |
| 2017/0145126 A1 | 5/2017 | Mahoney |
| 2017/0225157 A1 | 8/2017 | Lee |
| 2017/0247309 A1 | 8/2017 | Porcelli et al. |
| 2017/0267618 A1 | 9/2017 | Sookraj et al. |
| 2018/0016219 A1 | 1/2018 | Farmer et al. |
| 2018/0022677 A1 | 1/2018 | Sookraj |
| 2018/0029005 A1 | 2/2018 | Sookraj |
| 2018/0030014 A1 | 2/2018 | Sookraj et al. |
| 2018/0030015 A1 | 2/2018 | Farmer et al. |
| 2018/0030201 A1 | 2/2018 | Farmer et al. |
| 2018/0057619 A1 | 3/2018 | Sookraj |
| 2018/0094100 A1 | 4/2018 | Farmer et al. |
| 2018/0153746 A1 | 6/2018 | Sookraj |
| 2018/0155490 A1 | 6/2018 | Sookraj |
| 2018/0155491 A1 | 6/2018 | Sookraj |
| 2018/0282251 A1 | 10/2018 | Sookraj |
| 2018/0305286 A1 | 10/2018 | Sookraj |
| 2018/0305289 A1 | 10/2018 | Sookraj et al. |
| 2018/0354881 A1 | 12/2018 | Farmer et al. |
| 2018/0354882 A1 | 12/2018 | Sookraj |
| 2019/0002293 A1 | 1/2019 | Sookraj et al. |
| 2019/0002385 A1 | 1/2019 | Sookraj et al. |
| 2019/0002400 A1 | 1/2019 | Sookraj |
| 2019/0030520 A1 | 1/2019 | Lee |
| 2019/0031592 A1 | 1/2019 | Sookraj et al. |
| 2019/0047972 A1 | 2/2019 | Sookraj |
| 2019/0076834 A1 | 3/2019 | Sookraj |
| 2019/0076835 A1 | 3/2019 | Sookraj |
| 2019/0106532 A1 | 4/2019 | Sookraj |

FOREIGN PATENT DOCUMENTS

| | | |
|---|---|---|
| WO | 2012/030619 A1 | 3/2012 |
| WO | 2012/051219 A2 | 4/2012 |
| WO | 2012/158573 A1 | 11/2012 |
| WO | 2013/063191 A1 | 5/2013 |
| WO | 2013/122905 A1 | 8/2013 |
| WO | 2013/126375 A1 | 8/2013 |
| WO | 2014/004858 A1 | 1/2014 |
| WO | 2014008232 A2 | 1/2014 |
| WO | 2015/085295 A2 | 6/2015 |
| WO | 2015/138975 A1 | 9/2015 |
| WO | 2015/171372 A1 | 11/2015 |
| WO | 2015/184289 A1 | 12/2015 |
| WO | 2016/015019 A1 | 1/2016 |
| WO | 2016/130977 A1 | 8/2016 |
| WO | 2016/130988 A1 | 8/2016 |
| WO | 2016/130993 A1 | 8/2016 |
| WO | 2016/130998 A1 | 8/2016 |
| WO | 2016/131001 A1 | 8/2016 |
| WO | 2016/131004 A1 | 8/2016 |
| WO | 2016130947 A1 | 8/2016 |
| WO | 2016131003 A1 | 8/2016 |
| WO | 2017/023777 A1 | 2/2017 |
| WO | 2017023820 A1 | 2/2017 |
| WO | 2017/165323 A1 | 9/2017 |
| WO | 2017/165344 A1 | 9/2017 |
| WO | 2017/165345 A1 | 9/2017 |
| WO | 2018/085251 A1 | 5/2018 |
| WO | 2018/085254 A1 | 5/2018 |
| WO | 2018/106824 A1 | 6/2018 |
| WO | 2018/107185 A1 | 6/2018 |
| WO | 2018/136638 A1 | 7/2018 |
| WO | 2018/144998 A1 | 8/2018 |
| WO | 2018/170006 A1 | 9/2018 |
| WO | 2018/200466 A1 | 11/2018 |
| WO | 2018/200471 A1 | 11/2018 |
| WO | 2019/006366 A1 | 1/2019 |
| WO | 2019/006377 A1 | 1/2019 |
| WO | 2019/050649 A1 | 3/2019 |
| WO | 2019/051184 A1 | 3/2019 |
| WO | 2019/070981 A1 | 4/2019 |

OTHER PUBLICATIONS

Inoue et al., "Organometallic-Catalyzed Polymerization of Propiolactone", Die Makromolekulare Chemie, vol. 48, No. 1, May 25, 1961, pp. 229-233.

International Preliminary Report on Patentability received for PCT Patent Application No. PCT/US2018/016853, dated Jun. 20, 2019, 10 pages.

Rieth et al., "Single-Site l3-Diiminate Zinc Catalysts for the Ring-Opening Polymerization of l3-Butyrolactone and l3-Valerolactone to Poly(3-Hydroxyalkanoates)", Journal of the American Chemical Society, vol. 124, No. 51, 2002, pp. 15239-15248.

Schechtman et al, "Chemical Synthesis of Isotactic Poly(3-Hydroxyalkanoates)", Polymer Preprints, Division of Polymer Chemistry, Inc., vol. 40, No. 1, 1999, pp. 508-509.

Tanahashi et al., "Thermal Properties and Stereoregularity of Poly (3-Hydroxybutyrate) prepared from Optically Active l3-Butyrolactone with a Zinc-based Catalyst", Macromolecules, vol. 24, No. 20, 1991, pp. 5732-5733.

Zhang et al., "Stereochemistry of the Ring-Opening Polymerization of (S)-l3-Butyrolactone", Macromolecules, vol. 23, No. 13, 1990, pp. 3206-3212.

Church et al., "Carbonylation of Heterocycles by Homogeneous Catalysts", Chemical Communications, vol. 21, No. 7, 2007, pp. 657-674.

Fan et al., "Ethylene Formation by Catalytic Dehydration of Ethanol with Industrial Considerations", Materials (Basel), vol. 6, Dec. 2012, pp. 101-115.

Co Business Overview, "Novomer's Carbon Monoxide Based Chemicals Represent a Market Potential in Excess of $20 Billion Dollars", Available Online at. <https://web.archive.org/web/20150414122811 /http://www.novomer.com/co-business- overview>, Apr. 14, 2015, pp. 1-3.

International Search Report and Written Opinion received for PCT Patent Application No. PCT/US2018/016853, dated Jul. 20, 2018, 12 pages.

International Search Report and Written Opinion received for PCT Patent Application No. PCT/US2018/016859, dated Apr. 17, 2018, 9 pages.

Kadkin et al., "Polyester Polyols: Synthesis and Characterization of Diethylene Glycol Terephthalate Oligomers", Journal of Polymer Science Part A: Polymer Chemistry, vol. 41, 2003, pp. 1114-1123.

Moller et al., "Sn(OTf)2 and Sc(OTf)3: Efficient and versatile catalysts for the controlled polymerization of lactones", Journal of Polymer Science Part A Polymer Chemistry, vol. 38, Jun. 1, 2000, pp. 2067-2074.

Non-Final Office Action received for U.S. Appl. No. 15/369,764, dated Nov. 24, 2017, 12 pages.

"Polypropiolactone", Novomer Inc., Available Online at. <https://www.novomer.com/products/polypropiolactone>, Jul. 17, 2018, pp. 1-4.

* cited by examiner

BETA-PROPIOLACTONE BASED COPOLYMERS CONTAINING BIOGENIC CARBON, METHODS FOR THEIR PRODUCTION AND USES THEREOF

CROSS REFERENCE TO RELATED APPLICATIONS

This application is a continuation application of U.S. patent application Ser. No. 16/178,214, filed on Nov. 1, 2018, published as U.S. Publication No. US2019/0071538, which is a divisional application that claims priority to and the benefit of U.S. patent application Ser. No. 15/369,764, entitled "Beta-Propiolactone Based Copolymers Containing Biogenic Carbon, Methods For Their Production And Uses Thereof," filed on Dec. 5, 2016, each of which is herein incorporated by reference in their entirety.

FIELD

The present disclosure relates generally to polymeric materials and the production of polymers derived from beta-propiolactone that is produced from renewable ethylene oxide and carbon monoxide feed sources. More specifically this invention relates to propiolactone copolymers suitable for use in thermoplastic applications, moisture barrier applications, packaging application etc. and as chemical precursors along with methods of producing such polymers.

BACKGROUND

Poly(beta-propiolactone) is an aliphatic polyester and can be completely bio-degradable to CO2 and water. Poly(beta-propiolactone) has potential applications in many different areas including medical, pharmaceutical and packaging industries due to their biodegradability. The present invention relates to producing co-polymers from beta-propiolactone and a co-monomer.

Polypropiolactone (PPL) is a biodegradable polymer that can be used in many applications such as fibers and films. It is also known that PPL may be thermally degraded to high purity acrylic acid which is in high demand for the production of polyacrylic acid-based superabsorbent polymers, detergent co-builders, dispersants, flocculants and thickeners.

The recent advances in carbonylation of epoxides disclosed in U.S. Pat. No. 6,852,865 and the efficient ring opening polymerization of beta-propiolactone opened up the efficient synthetic routes to poly(beta-propiolactone) from ethylene oxide and CO. However, there are practical problems, preventing highly amorphous poly(beta-lactone) from industrially processed. Highly amorphous poly(beta-propiolactone) has been nearly impossible to produce at reasonable operating rates due to its low melting point.

There is a need to provide highly biodegradable polymers for products that have a short usable life and thereafter need rapid assimilation back into the environment. Production of such polymers from renewable sources and recycled sources will further reduce their environment foot print. As such, there remains a need for methods of producing a co-polymer of beta-propiolactone, having improved processability and thermal stability.

BRIEF SUMMARY OF THE INVENTION

Polymerization of poly-propiolactone (PPL) from beta-propiolactone (bPL) is generally known, however the present invention is directed to systems and methods for including bPL obtained from the carbonylation of ethylene oxide (EO) and preferably carbon monoxide (CO) from bio-mass sources into lactone based copolymers. Renewably sourced bPL may be polymerized to produce PPL homo polymers and PPL heteropolymers and PPL polymer derivatives. These uniquely sustainable polymers are highly biodegradable while still meeting the performance requirements for the materials demanded in many applications. Such bPL derived polymers retain the biodegradability of the beta-propiolactone constituents and provide an environmentally friendly benefit to many applications that now use polymers with poor biodegrade properties and poor bio-based carbon content. Combining sourcing of the bPL copolymer precursors from EO containing carbon from bio-mass sources and preferably CO from bio-mass sources of provides significant and needed environment benefits.

The ability to use bPL derived at least in part from EO and CO containing renewable and recycled carbon magnifies the environmental benefit obtained from the polymers of this invention and the production methods of this invention.

The present invention relates to producing co-polymers from beta-propiolactone and a co-monomer wherein at least the beta-propiolactone has a bio-content.

Some aspects of this invention provide a linear bPL copolymer produced from a feed stream of bPL and a comonomer where the bPL is obtained by the carbonylation of EO and CO and wherein at least a portion of the EO contains carbon from bio-mass sources, also known as biogenic carbon. In preferred aspects of this invention all of the EO is derived from biogenic carbon. In highly preferred aspects of this invention all of the EO and CO is derived from biogenic carbon.

Certain aspects of this invention provide a method of producing a bPL copolymer, comprising combining bPL and an initiator in the presence of a metal cation and a comonomer to produce the bPL based copolymer (hereinafter also referred to as the "copolymer") wherein the bPL is produced by the carbonylation of EO and CO sourced at least in part from one or more renewable feed stocks. In preferred aspects of this invention all of the EO is derived from renewable sources. In other preferred aspects of this invention at least a portion of the CO is derived from renewable sources. In highly preferred aspects of this invention all of the EO and CO are derived from renewable sources.

In a broad embodiment, the bPL co-polymer is produced by ring opening polymerization of biogenic beta-propiolactone and a co-monomer. In a preferred embodiment the co-monomer is selected from the group comprising lactones and anhydrides.

In some aspects, the co-monomer is a lactone having a greater number of carbon atoms than bPL and is herein referred to as a higher lactone.

In some aspects, the co-monomer is a beta-lactone having a greater number of carbon atoms bPL and herein referred to as a higher beta-lactone.

In further aspects, suitable higher beta-lactones for the co-polymerization include beta-butyrolactone, beta-valerolactone, beta-heptanolactone, beta-tridecanolactone, cis-3,4-dimethyloxetan-2-one, 4-(butoxymethyl)-2-oxetanone, 4-[[[(1,1-dimethylethyl)dimethylsilyl]oxy]methyl]-2-oxetanone, 4-[(2-propen-1-yloxy)methyl]-2-oxetanone, 4-[(benzoyloxy)methyl]-2-Oxetanone.

In some aspects of this invention, the co-monomer is a cyclic anhydride. In preferred aspects, the cyclic anhydrides include succinic anhydride, and maleic anhydride.

In some embodiments, the co-polymerization of beta-lactones and cyclic anhydride is performed in the presence of polymerization catalyst. The polymerization catalyst initiates the ring opening polymerization of beta-lactones or cyclic anhydrides to produce co-polymers. A broad range of polymerization catalysts can be used for the initiation of the ring opening polymerization.

In another aspect this invention is a linear polyester comprising a bPL based copolymer having linear chains of repeating (O(CH2)2CO)X units containing carbon and oxygen atoms provided by a bPL feed produced from the carbonylation of EO containing carbon and oxygen atoms that originate from a renewable source. Where X is a comonomer unit from paragraph 0014 and/or 0015. In another variation of the invention the carbon source is CO that contains carbon and oxygen atoms that originate from a renewable source. In another variation of the invention all of the atoms in EO are derived from a renewable source. In another variation of the invention all of the atoms in the EO and CO originate from a renewable source. In certain variations the polymer chains have opposing end groups of initiator and a cation. In other variations the initiator comprises an anionic nucleophile.

In preferred applications of this invention the copolymers described herein, may be suitable for use as thermoplastics. PPL polymers are known to have relatively low melting points. The melting point of the thermoplastics obtained by this invention may be adjusted by the selection of the co-monomer. Thus, the thermoplastics of this invention may use as fiber, films, and structural components.

Structural components that may be formed using the copolymers of this invention include any article requiring rigidity or load bearing capacity. Examples of Structural components include household items, furniture, building components, sculptures and machinery assemblies. For application as structural components, the copolymer of this invention the comonomers will be selected to provide the copolymer with a relatively high melting temperature.

Fibers and films application for the copolymers of this invention can also include a wide range of products. Such products can include biodegradable packaging and biodegradable moisture barriers for multilayer that comprise a component of diapers, adult incontinence products, or feminine hygiene products. In these applications the comonomers will typically be selected to give copolymer a relatively low melting temperature.

In preferred applications of this invention the copolymers described herein, may be suitable for use as thermoplastics having low melting temperatures. Such thermoplastics may have use as molding materials.

In another embodiment this invention is a method to produce a bPL copolymer. Thus in various aspects, production systems/production processes for producing the bPL copolymer are provided.

Accordingly in one aspect the invention is a method for producing a bPL copolymer having from renewable carbon content. In this aspect one feed component is a bPL monomer derived having biogenic carbon content. Another feed component is a comonomer. The method combines the monomer and comonomer with polymerization catalyst in a polymerization reaction zone at polymerization conditions to produce a bPL based copolymer that is recovered as at least part of a product stream. Preferably at least a portion of the bPL monomer feed component comprises bPL produced by the carbonylation of ethylene oxide having a bio-content of at least 10% with carbon monoxide that optionally has a bio-content of at least 10% and a comonomer derived from a lactone other than beta-propiolactone.

In another aspect, the method of this invention combines the bPL monomer, comonomer and optional polymerization catalyst or initiator to produce the bPL based copolymer. This can be done in one or more reactors in series.

In another aspect, method of this invention a product stream containing the bPL based co-polymer includes at least one of the bPL monomer, the comonomer and the polymerization catalyst is recovered from the polymerization reaction zone. In this aspect at least a portion of the bPL based copolymer is separated from any bPL monomer, the comonomer and/or the polymerization catalyst and a purified bPL based copolymer having a higher bPL content than the bPL product stream is recovered. In a preferred form of this aspect at least a portion of any bPL monomer, the comonomer and/or polymerization catalyst separated from the product stream is recycled to the polymerization reaction zone.

In a further aspect, the polymerization zone include multiple polymerization reactors and one or more intermediate product stream comprising the bPL based polymer, bPL monomer, the comonomer and the polymerization catalyst pass from one polymerization reactor to another polymerization reactor. The polymerization reactors in this aspect have one or more inlets and one or more outlets and one or more transfer conduits to transfer intermediate product stream between the polymerization reactors.

In another aspect the invention is process for producing a sustainable bPL based copolymer comprising beta-propiolactone monomers and higher lactone monomers that starts with the production of the bPL monomers having a suitable bio-content. The process begins with combining EO having a bio-content, CO preferably having bio-content, carbonylation catalyst, and solvent in a carbonylation reaction zone at carbonylation conditions; producing bPL; and recovering at least a portion of the bPL as a bPL output stream. At least a portion of the bPL output stream passes to a bPL purification zone that produces a recycle stream comprising at least one of EO, CO, carbonylation catalyst, and solvent and the bPL output stream; and, at least a portion of the bPL recycle stream is returned to the carbonylation reaction zone. This aspect combines feed components comprising a bPL polymerization initiator and a cation donor, and at least a portion of bPL output stream and contacts the feed components in a polymerization reactor at polymerization conditions to produce a bPL based copolymer. At least a portion of the bPL based copolymer is recovered as a This aspect combines feed components comprising a bPL polymerization initiator and a cation donor, and at least a portion of bPL output stream and contacts the feed components in a polymerization reactor at polymerization conditions to produce a bPL based copolymer. At least a portion of the bPL based copolymer is recovered as a bPL copolymer output stream.

The present application can be best understood by reference to the following description.

DETAILED DESCRIPTION

The following description sets forth exemplary methods, parameters and the like. It should be recognized, however, that such description is not intended as a limitation on the scope of the present disclosure but is instead provided as a description of exemplary aspects.

Definitions

The terms bio-content and bio-based content mean biogenic carbon also known as bio-mass derived carbon.

In some variations, bio-content (also referred to as "bio-based content") can be determined based on the following:

% Bio-content or Bio-based content=
[Bio (Organic) Carbon]/[Total (Organic) Carbon]100%,
as determined by ASTM D6866 (Standard Test Methods for Determining the Bio-based (biogenic) Content of Solid, Liquid, and Gaseous Samples Using Radiocarbon Analysis).

The bio-content of the polymers may depend based on the bio-content of the beta-propiolactone used. For example, in some variations of the methods described herein, the beta-propiolactone used to produce the polymers described herein may have a bio-content of greater than 0%, and less than 100%. In certain variations of the methods described herein, the beta-propiolactone used to produce the polymers described herein may have a bio-content of at least 10%, at least 20%, at least 30%, at least 40%, at least 50%, at least 60%, at least 70%, at least 80%, at least 90%, at least 95%, at least 96%, at least 97%, at least 98%, at least 99%, at least 99.5%, at least 99.9%, at least 99.99%, or 100%. In certain variations, beta-propiolactone derived from renewable sources is used. In other variations, at least a portion of the beta-propiolactone used is derived from renewable sources, and at least a portion of the beta-propiolactone is derived from non-renewable sources.

The bio-content of the beta-propiolactone may depend on, for example, the bio-content of the ethylene oxide and carbon monoxide used. In some variations, both ethylene oxide and carbon monoxide are derived from biogenic or bio-mass based carbon sources.

Biodegradability

In some variations of the foregoing, the polymer has a biodegradability of at least 10%, at least 20%, at least 30%, at least 40%, at least 50%, at least 60%, at least 70%, at least 80%, at least 90%, at least 95%, at least 96%, at least 97%, at least 98%, at least 99%, at least 99.5%, at least 99.9%, at least 99.99%, or 100%.

Biodegradable and biodegradability is as defined and determined based on ASTM D5338-15 (Standard Test Method for Determining Aerobic Biodegradation of Plastic Materials Under Controlled Composting Conditions, Incorporating Thermophilic Temperatures).

In other aspects the product stream comprises at least one of bPL polymerization initiator, and cation donor and at least a portion of the product stream passes to a purification zone. The purification zone recovers at least one of beta-propiolactone, bPL polymerization initiator and cation donor from the product stream in one or more recycle streams and produces a purified product stream and at least a portion of a recycle stream is returned to the polymerization reaction zone to provide a purified product stream comprising a bPL based copolymer in a higher concentration than the product stream is recovered from the process. In other aspects the polymerization reaction zone comprises multiple reactors, an upstream reactor produces the product stream; at least a portion of the purified product stream enters a downstream reactor and a high purity product stream is recovered from the downstream reactor. A portion of the recycle stream may pass to the upstream reactor.

Definitions of specific functional groups and chemical terms are described in more detail below. The chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The terms "halo" and "halogen" as used herein refer to an atom selected from fluorine (fluoro, —F), chlorine (chloro, —Cl), bromine (bromo, —Br), and iodine (iodo, —I).

The terms "halide" as used herein refer to a halogen bearing a negative charge selected from fluoride —F$^-$, chloride —Cl$^-$, bromide —Br$^-$, and iodide —I$^-$.

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In some aspects, aliphatic groups contain 1-12 carbon atoms. In some aspects, aliphatic groups contain 1-8 carbon atoms. In some aspects, aliphatic groups contain 1-6 carbon atoms. In some aspects, aliphatic groups contain 1-5 carbon atoms, in some aspects, aliphatic groups contain 1-4 carbon atoms, in yet other aspects aliphatic groups contain 1-3 carbon atoms, and in yet other aspects, aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, phosphorus, or boron. In some aspects, one or two carbon atoms are independently replaced by one or more of oxygen, sulfur, nitrogen, or phosphorus. Heteroaliphatic groups may be substituted or unsubstituted, branched or unbranched, cyclic or acyclic, and include "heterocycle," "heterocyclyl," "heterocycloaliphatic," or "heterocyclic" groups.

The term "acrylate" or "acrylates" as used herein refer to any acyl group having a vinyl group adjacent to the acyl carbonyl. The terms encompass mono-, di- and tri-substituted vinyl groups. Examples of acrylates include, but are not limited to: acrylate, methacrylate, ethacrylate, cinnamate (3-phenylacrylate), crotonate, tiglate, and senecioate.

The term "polymer", as used herein, refers to a molecule of high relative molecular mass, the structure of which comprises the multiple repetitions of units derived, actually or conceptually, from molecules of low relative molecular mass. In some aspects, a polymer is comprised of only one monomer species (e.g., polyEO). In some aspects, a polymer is a copolymer, terpolymer, heteropolymer, block copolymer, or tapered heteropolymer of one or more epoxides.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic, bicyclic, or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, and cyclooctadienyl. In some aspects, the cycloalkyl has 3-6 carbons. Representative carbocyles include cyclopropane, cyclobutane, cyclopentane, cyclohexane, bicyclo[2,2,1]heptane, norbornene, phenyl, cyclohexene, naphthalene, and spiro[4.5]decane. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In some aspects, a carbocyclic group is bicyclic. In some aspects, a carbocyclic group is tricyclic. In some aspects, a carbocyclic group is polycyclic.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In some aspects, alkyl groups contain 1-8 carbon atoms. In some aspects, alkyl groups contain 1-6 carbon atoms. In some aspects, alkyl groups contain 1-5 carbon atoms, in some aspects, alkyl groups contain 1-4 carbon atoms, in yet other aspects, alkyl groups contain 1-3 carbon atoms, and in yet other aspects alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In some aspects, "aryl" refers to an aromatic ring system which includes, but is not limited to, phenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenanthridinyl, or tetrahydronaphthyl, and the like.

The terms "heteroaryl" and "heteroar-", used alone or as part of a larger moiety, e.g., "heteroaralkyl", or "heteroaralkoxy", refer to groups having 5 to 14 ring atoms, preferably 5, 6, 9 or 10 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Non-limiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be monocyclic or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle", "heterocyclyl", "heterocyclic radical", and "heterocyclic ring" are used interchangeably and refer to a stable 5- to 7-membered monocyclic or 7- to 14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned may include those that result in the formation of stable or chemically feasible compounds. The term "stable", as used herein, refers to compounds that are not substantially altered when subjected to conditions to allow for their production, detection, and, in some aspects, their recovery, purification, and use for one or more of the purposes disclosed herein.

In some chemical structures herein, substituents are shown attached to a bond which crosses a bond in a ring of the depicted molecule. This means that one or more of the substituents may be attached to the ring at any available position (usually in place of a hydrogen atom of the parent structure). In cases where an atom of a ring so substituted has two substitutable positions, two groups may be present on the same ring atom. When more than one substituent is present, each is defined independently of the others, and each may have a different structure. In cases where the substituent shown crossing a bond of the ring is —R, this has the same meaning as if the ring were said to be "optionally substituted" as described in the preceding paragraph.

As used herein, the term "catalyst" refers to a substance the presence of which increases the rate of a chemical reaction, while not being consumed or undergoing a permanent chemical change itself.

Renewable sources means a source of carbon and/or hydrogen obtained from biological life forms that can replenish itself in less than one hundred years.

Renewable carbon means carbon obtained from biological life forms that can replenish itself in less than one hundred years.

Recycled sources mean carbon and/or hydrogen recovered from a previous use in a manufactured article.

Recycled carbon means carbon recovered from a previous use in a manufactured article.

Green constituents means the carbon atoms and hydrogen atoms from renewable sources and from recycled sources in a material.

Green carbon means the total of renewable carbon and recycled carbon in a material.

Biodegradability and biodegradable refers to the ability of a material to be broken down (decomposed) rapidly by the action of living organisms such as bacteria, fungi, microorganisms or other biological means wherein rapidly typically less than 10 years, 5 years, for 2 years.

Sustainable material and sustainable polymer means a biodegradable material and polymer, respectively, that is derived at least in part for green sources and has a percentage of green substituents equal to a minimum of 10%, and more typically 20%, 50%, 75%, 90%, 95%, or 100% of the total amount of carbon and hydrogen in the material.

As used herein, the term "about" preceding one or more numerical values means the numerical value ±5%. It should be understood that reference to "about" a value or parameter herein includes (and describes) aspects that are directed to that value or parameter per se. For example, description referring to "about x" includes description of "x" per se.

Further, it should be understood that reference to "between" two values or parameters herein includes (and describes) aspects that include those two values or parameters per se. For example, description referring to "between x and y" includes description of "x" and "y" per se.

The mass fractions disclosed herein can be converted to wt. % by multiplying by 100.

Biogenic Content and Sourcing of the bPL Monomer

The polymer of this invention will use bPL that can be produced from EO and CO according to the following general reaction schemes shown in FIGS. 1 and 2. In addition in this invention at least one of the EO and/or CO used to produce the bPL monomer will have a bio-content of at least 10% and preferably at least 20%, at least 30%, at least 40%, at least 50%, at least 60%, at least 70%, at least 80%, at least 90%, at least 95%, at least 99%, or 100%.

The comonomers used in addition to the bPL monomers may have contain carbon with a significant bio-content. In some variation the comomers may have a bio-content of at least 10% and preferably at least 20%, at least 30%, at least 40%, at least 50%, at least 60%, at least 70%, at least 80%, at least 90%, at least 95%, at least 99%, or 100%.

In variations of the foregoing, the resulting bPL copolymer will a bio-content of greater than 0%, and less than 100%. In certain variations of the foregoing, the polymer has a bio-content of at least 10%, at least 20%, at least 30%, at least 40%, at least 50%, at least 60%, at least 70%, at least 80%, at least 90%, at least 95%, at least 99%, at least 99.5%, at least 99.9%, or 100%.

In this aspect of the invention the EO undergoes a carbonylation reaction, e.g., with CO, in the presence of a carbonylation catalyst to produce the bPL monomer for production of the bPL based copolymer.

In the carbonylation reaction system, EO can be converted to bPL by a carbonylation reaction, as depicted in the reaction scheme below.

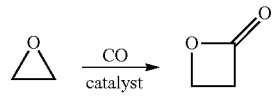

The chemistry involved in a carbonylation reaction system can include, but are not limited to, the following three reactions: (1) CO+EO to bPL; (2) EO to acetaldehyde; (3) bPL to succinic anhydride. The conversions for the three reactions may vary depending on many factors including amount of reactants, amount of catalyst, temperature, pressure, flow rate, etc.

The carbonylation methods may utilize a metal carbonyl-Lewis acid catalyst such as those described in U.S. Pat. No. 6,852,865. In other aspects, the carbonylation step is performed with one or more of the carbonylation catalysts disclosed in U.S. patent application Ser. No. 10/820,958; and Ser. No. 10/586,826. In other aspects, the carbonylation step is performed with one or more of the catalysts disclosed in U.S. Pat. Nos. 5,310,948; 7,420,064; and 5,359,081. Additional catalysts for the carbonylation of epoxides are discussed in a review in Chem. Commun., 2007, 657-674. The entirety of each of the preceding references is incorporated herein by reference.

The carbonylation catalyst feed can be pumped under CO pressure to help ensure stability of the catalyst and can be cooled, optionally along with the feed, below ambient temperature to ensure stability. Carbonylation catalyst can arrive to the carbonylation catalyst source as either solids, that may be blanketed under CO or a suitable inert gas) or in solution of solvent such as hexane or THF. The carbonylation catalyst feed can be pumped under CO pressure to help ensure stability of the catalyst and can be cooled, optionally along with the feed, below ambient temperature to ensure stability.

In yet other variations, the systems/processes provided to practice the method herein are also configured to manage and integrate heat produced. The carbonylation reaction to produce bPL and the polymerization reaction to produce bPL based copolymer are exothermic. Thus, the heat generated from the exothermic unit operations, such as the carbonylation reactor and polymerization reactor can be captured and used for cooling in endothermic unit operations, such as the distillation apparatus and thermolysis reactor. For example, in some variations of the systems and methods provided herein, steam may be generated in heat transfer equipment (e.g., shell and tube heat exchanger and reactor cooling jacket) via a temperature gradient between process fluid and water/steam. This steam can be used for heat integration between exothermic and endothermic unit operations. In other variations of the systems and methods provided herein, other suitable heat transfer fluids may be used.

In other variations, heat integration may be achieved by combining certain unit operations. For example, heat integration may be achieved by combining polymerization of bPL and vaporization of the solvent (e.g., THF) from the distillation column within a single unit operation. In such a configuration, the heat liberated from the bPL polymerization reaction is used directly to vaporize the solvent in the distillation apparatus, and the output of the unit produces PPL. In other variations, the heat liberated from the polymerization reaction can be exported to other systems at the same production site. The distillation apparatus may recover at least a portion of the carbonylation catalyst present in the bPL product stream using a multi-solvent system.

The EO and CO preferably have a concentration of water and oxygen less than about 500 ppm, less than about 250 ppm, less than about 100 ppm, less than about 50 ppm, less than about 10 ppm, less than about 2 ppm, or less than 1 ppm.

The carbonylation reactor may be a continuous reactor, such as a continuous stirred tank reactor (CSTR). Other reactors described herein, such as batch reactors, plug flow reactors (PFR), and semi-batch reactors may also be employed.

In certain variations, the reactor is equipped with an external cooler (heat exchanger). In some variations, the carbonylation reaction achieves a selectivity of bPL above 99%.

The post-isolation bPL product stream may have any concentration of bPL, solvent, EO, CO, by-products (such as acetaldehyde and succinic anhydride), carbonylation catalyst, or carbonylation catalyst components described herein. In some aspects, the mass fraction of bPL in the post-isolation bPL product stream can be about 0.1 to 0.4, or the mole fraction of bPL in the post-isolation bPL product stream can be about 0.1 to about 0.4. The post-isolation bPL product stream can also include other components including unreacted EO (in mass fraction of about 0.005 to 0.1), unreacted CO (in mass fraction of about 0.0005 to 0.001, or at most about 0.002), acetaldehyde (in mass fraction of about 0.0005 to 0.001, or at most about 0.002), succinic anhydride (in mass fraction of about 0.0005 to 0.01, or at most about 0.02), carbonylation catalyst, carbonylation catalyst, and the remainder solvent. In some aspects, the post-isolation bPL product stream from the carbonylation catalyst recycling system can have a temperature of about 20° C. to about 60° C. In some aspects, the post-isolation bPL product stream can have a pressure of about 1 to about 5 bar.

The bPL production system/production process may receive additional components comprising diluents which do not directly participate in the chemical reactions of EO. The diluents may include one or more inert gases (e.g., nitrogen, argon, helium and the like) or volatile organic molecules such as hydrocarbons, ethers, and the like. The reaction stream may comprise hydrogen, CO of carbon dioxide, methane, and other compounds commonly found in industrial CO streams. Such additional components may have a direct or indirect chemical function in one or more of the processes involved in the conversion of EO to bPL and various end products. CO may be provided in a mixture with hydrogen from renewable sources such as syngas.

Further details of methods and process for the production of EO by carbonylation with CO are disclosed in U.S. Ser. No. 15/197,838 filed Jun. 30, 2016 the contents of which is herein incorporated by reference in its entirety.

bPL Based Copolymer Composition

In one embodiment, the co-polymer is produced by ring opening polymerization of beta-propiolactone and a co-monomer. A wide variety of comonomers may be used with the bPL monomer and will generally be those comonomers that will add biodegradability to the resulting copolymer.

In addition to biodegradability and bio-content, comonomers and additives that can impart other desired characteristics into the resulting bPL based copolymer. Of particular interest are phase behavior and mechanical properties. A wide variety of additives may be used. Such additives include flame retardants, plasticizers, pigments, heat and light stabilizers, fillers and fiber reinforcement.

Suitable comonomer include lactone comonomers having a higher number of carbon atoms than beta-propiolactone, in particular beta-lactones), anhydrides, and alcohols. Specific examples of suitable compounds to provide the comonomers include diols, caprolactone and lactic acid.

In some aspects, the co-monomer is a higher beta-lactone having a greater number of carbon atoms that bPL and herein referred to as a higher beta-lactone. Suitable higher beta-lactones for the co-polymerization include beta-butyrolactone, beta-valerolactone, beta-heptanolactone, beta-tridecanolactone, cis-3,4-dimethyloxetan-2-one, 4-(but-3-en-1-yl)oxetan-2-one, 4-(butoxymethyl)-2-oxetanone, 4-[[[(1,1-dimethylethyl)dimethylsilyl]oxy]methyl]-2-oxetanone, 4-[(2-propen-1-yloxy)methyl]-2-oxetanone, 4-[(benzoyloxy)methyl]-2-Oxetanone.

In some aspects of this invention, the co-monomer is a cyclic anhydride. In preferred aspects, the cyclic anhydrides include succinic anhydride, and maleic anhydride. In some aspects of this invention, the co-monomer is a cyclic anhydride. In preferred aspects, the cyclic anhydrides include succinic anhydride, and maleic anhydride.

The bPL based copolymers produced by this invention will have the structure shown below:

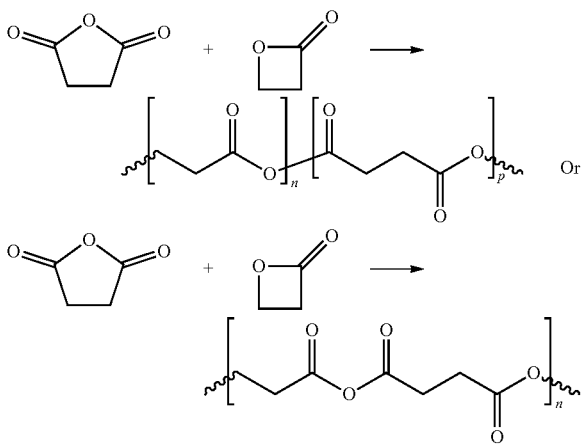

In some embodiments, the co-polymerization of beta-lactones and cyclic anhydride is performed in the presence of polymerization initiator. The polymerization initiator initiates the ring opening polymerization of beta-lactones and cyclic anhydrides to produce co-polymers. A broad range of polymerization catalysts can be used for the initiation of the ring opening polymerization.

In some aspects of this invention the polymerization initiator is an ionic initiator. In variations of this aspect, the ionic initiator has the general formula of M"X where M" is cationic and X is anionic.

M" is selected from the group consisting of Li+, Na+, K+, Mg2+, Ca2+, and Al3+. In some embodiments, M" is Na+. In some embodiments, M" is an organic cation. In some embodiments, the organic cation is selected from the group consisting of quaternary ammonium, imidazolium, and bis(triphenylphosphine)iminium. In some embodiments, the quaternary ammonium cation is tetraalkyl ammonium.

X is a nucleophilic anion. Suitable nucleophilic anions include, but not limited to, compounds comprising at least one carboxylate group, at least one alkoxide group, at least one phenoxide group, and combination thereof. In some embodiments, the nucleophilic anion is selected from the group consisting of halides, hydroxide, alkoxide, carboxylate, and combination thereof. In some embodiments, the ionic initiator is sodium acrylate. In some embodiments, the ionic initiator is tetrabutylammonium acrylate.

In some embodiments, the polymerization is performed in the presence of a solvent. The solvent may be selected from any solvent, and mixtures of solvents.

Suitable solvents for the polymerization with cyclic anhydride monomers include methylene chloride, chloroform, tetrahydrofuran, sulfolane, N-methyl pyrrolidone, diglyme, triglyme, tetraglyme, and dibasic esters.

In one embodiment, said co-polymer is produced by reacting beta-propiolactone and an alcohol comprising at least two hydroxyl groups. Although, applicants are not bound to any theory as to how the co-polymer of beta-lactone and the alcohol comprising at least two hydroxyl groups, beta-propiolactone may react with the alcohol to form a carboxylic acid comprising at least two carboxylic acid groups as shown in the below scheme. The carboxylic acid having at least two carboxylic acid groups may further react with the alcohol having at least two hydroxyl groups by condensation polymerization to produce the co-polymer.

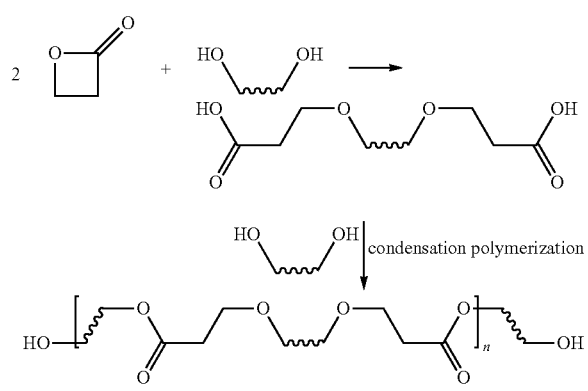

Scheme 1.

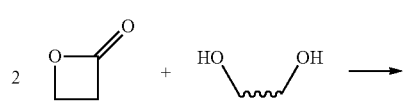

Scheme 2.

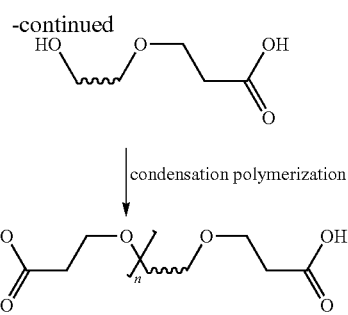

In variations of this embodiment, the alcohol is a diol. In some embodiments, suitable diols include ethylene glycol, propylene glycol, 1,4-butanediol, diethylene glycol, bis(hydroxymethyl)octadecanol and 1,6-hexanediol.

In further variation of this embodiment, the reaction can be conducted in the presence of a solvent. In some embodiments, suitable solvents include toluene, xylene and mesitylene. In some embodiments, the reaction setup allows continuous removal of water formed during the esterification reaction. In certain variations, the polymer chains have opposing end groups of an initiator and a cation. In other variations, the initiator comprises an anionic nucleophile.

The suitable anionic nucleophiles include $R^xO^-$, $R^xC(=O)O^-$, $R^xS^-$, $R^xO(C=O)O^-$, halide (e.g., $Br^-$, $I^-$, $Cl^-$), $R^x(SO_2)O^-$ and $PR^x_3O^-$, wherein each $R^x$ is, independently, selected from hydrogen, optionally substituted aliphatic, optionally substituted heteroaliphatic, optionally substituted aryl and optionally substituted heteroaryl.

In certain aspects where the anionic nucleophile is $R^xC(=O)O^-$, $R^x$ is selected from optionally substituted aliphatic, fluorinated aliphatic, optionally substituted heteroaliphatic, optionally substituted aryl, fluorinated aryl, and optionally substituted heteroaryl. For example in certain aspects the initiator may be $CH_2=CHCO_2^-$, $CH_3CO_2^-$, or $CF_3CO_2^-$.

In certain aspects where the initiator is $R^xO^-$, $R^x$ is selected from optionally substituted aliphatic, optionally substituted heteroaliphatic, optionally substituted aryl, and optionally substituted heteroaryl. For example, in certain aspects the initiator is hydroxide, methoxide, or ethoxide.

In some aspects the cation is selected from the group of inorganic and organic cations given above.

A wide variety of other polymerization initiators and catalyst may be used. Any suitable polymerization initiators and/or catalysts may be used to convert the bPL monomer and the comomers into the copolymer product stream entering the co-polymer production system/production process into a co-polymer product stream.

In addition to the following description suitable catalysts, initiators, additives and solvent for the polymerization of the bPL monomer and the comonomers can be found in U.S. Ser. No. 15/197,838 filed Jun. 30, 2016 the contents of which is herein incorporated by reference in its entirety.

Other Catalysts suitable for the ring-opening polymerization step of the methods disclosed herein are disclosed, for example, in: Journal of the American Chemical Society (2002), 124(51), 15239-15248 Macromolecules, vol. 24, No. 20, pp. 5732-5733, Journal of Polymer Science, Part A-1, vol. 9, No. 10, pp. 2775-2787; Inoue, S., Y. Tomoi, T. Tsuruta & J. Furukawa; Macromolecules, vol. 26, No. 20, pp. 5533-5534; Macromolecules, vol. 23, No. 13, pp. 3206-3212; Polymer Preprints (1999), 40(1), 508-509; Macromolecules, vol. 21, No. 9, pp. 2657-2668; and Journal of Organometallic Chemistry, vol. 341, No. 1-3, pp. 83-9; and in U.S. Pat. Nos. 3,678,069, 3,169,945, 6,133,402; 5,648, 452; 6,316,590; 6,538,101; and 6,608,170. The entirety of each of which is hereby incorporated herein by reference.

The polymerization process may further comprise a polymerization initiator including but not limited to amines, polyamines, phosphines amongst others. Further, a variety of polymerization initiators may be used in the polymerization process, including by not limited to carbonates of alkali- and alkaline earth metals. In certain aspects, suitable polymerization initiators include carboxylate salts of metal ions or organic cations. In certain aspects, a polymerization initiator is combined with the production stream containing bPL. In certain aspects, the molar ratio of the polymerization initiator to the bPL in the production stream is about 1:15000. In certain aspects, the molar ratio of polymerization intiator: bPL is about 1:100, 1:10000, 1:1000, 1:20000 or a range including any two of these ratios.

The polymerization initiator may comprises a carboxylate salt, the carboxylate has a structure such that upon initiating polymerization of bPL, the polymer chains produced have an acrylate chain end. In certain aspects, the carboxylate ion on a polymerization initiator is the anionic form of a chain transfer agent used in the polymerization process.

In some aspects, the homogeneous polymerization initiator is a quaternary ammonium salt (for example, tetrabutylammonium (TBA) acrylate, TBA acetate, trimethylphenylammonium acrylate, or trimethylphenylammonium acetate) or a phosphine (for example, tetraphenyl phosphonium acrylate).

In some aspects, the catalyst is tetrabutylammonium acrylate, sodium acrylate, potassium acrylate, iron chloride, tetrabutylammonium acetate, trimethylphenylammonium acrylate, trimethylphenylammonium acetate, or tetraphenyl phosphonium acrylate.

In some aspects, the homogeneous polymerization initiator is added to a polymerization reactor as a liquid. In other aspects it is added as a solid, which then becomes homogeneous in the polymerization reaction. In some aspects where the polymerization initiator is added as a liquid, the polymerization initiator may be added to the polymerization reactor as a melt or in any suitable solvent. For example, in some variations molten bPL is used as a solvent.

In some aspects, the solvent for the polymerization initiator is selected such that the initiator is soluble, the solvent does not contaminate the product polymer, and the solvent is dry. In certain variations, solid PPL is added to a polymerization reactor, heated above room temperature until liquid, and used as the polymerization initiator solvent.

In some variations the process uses polymerization catalyst as described below and as further described in U.S. Ser. No. 15/197,838 the contents of which have been incorporated by reference.

In some aspects of the invention the catalyst comprises a carboxylate salt as a homogeneous polymerization catalyst.

In some aspects, the catalyst is a heterogeneous polymerization catalyst in the form of a solid-supported quaternary ammonium salt (for example, tetrabutylammonium (TBA) acrylate, TBA acetate, trimethylphenylammonium acrylate, or trimethylphenylammonium acetate) or a phosphine (for example, tetraphenyl phosphonium acrylate), iron chloride.

In addition to those already mentioned the polymerization process may include one or more of solvents including hydrocarbons, ethers, esters, ketones, nitriles, amides, sulfones, halogenated hydrocarbons, and the like. In certain aspects, the solvent is selected such that the copolymer product stream is soluble in the reaction medium. The solvents may also comprise Lewis bases of low to moderate polarity.

What is claimed is:

1. A copolymer comprising beta-propiolactone monomers and at least one co-monomer selected from the group consisting of lactic acid and an alcohol having greater than two hydroxyl groups wherein the copolymer contains an anionic nucleophile and cationic chain ends.

2. The copolymer of claim 1, wherein the comonomer has a bio-content.

3. The copolymer of claim 1, wherein the comonomer has a bio-content of at least 50%.

4. The copolymer of claim 1, wherein the copolymer has a bio-content of at least 50%.

5. The copolymer of claim 1, wherein the anionic nucleophile is at least one compound with the formula $R^xO^-$, $R^xC(=O)O^-$, $R^xS^-$, $R^xO(C=O)O^-$, $R^x(SO_2)O^-$ and $PRF^x_3O^-$, wherein each $R^x$ is, independently, selected from hydrogen, optionally substituted aliphatic, optionally substituted heteroaliphatic, optionally substituted aryl and optionally substituted heteroaryl.

6. The copolymer of claim 5, wherein $R^xO^-$, $R^x$ is selected from optionally substituted aliphatic, optionally substituted heteroaliphatic, optionally substituted aryl, and optionally substituted heteroaryl.

7. The copolymer of claim 6, wherein the anionic nucleophile is a hydroxide, methoxide, and/or ethoxide.

8. The copolymer of claim 5, wherein the anionic nucleophile is a halide.

9. The polymer of claim 5, wherein the anionic nucleophile is at least one compound with the formula $CH_2=CHCO_2^-$, $CH_3CO_2^-$, or $CF_3CO_2^-$.

10. The polymer of claim 5, wherein the cation is selected from the group consisting of $Li^+$, $Na^+$, $K^+$, $Mg^{2+}$, $Ca^{2+}$, $Al^{3+}$, and $Na^+$.

11. The copolymer of claim 5, wherein cation is an organic cation.

12. The copolymer of claim 11, wherein the organic cation is selected from the group consisting of quaternary ammonium, imidazolium, bis(triphenylphosphine)iminium and tetraalkyl ammomum.

13. The copolymer of claim 1, wherein the copolymer it is forms at least part of a sanitary product.

14. The copolymer of claim 1, wherein the copolymer is formed into at least part of a structural product.

15. A linear copolymer comprising chains of propiolactone monomer units and at least one co-monomer derived from at least one higher beta lactone moiety wherein the higher beta lactone moiety is derived from a beta lactone other than propiolactone and wherein the polypropiolactone monomer units are produced by the decyliztion of beta-propiolactone derived from the carbonylation of ethylene oxide with carbon monoxide using ethylene oxide that has a bio-content of at least 10% and using carbon monoxide that optionally has a bio-content greater than 10%.

16. The copolymer of claim 15, wherein the ethylene oxide has a bio-content of at least 75% and preferably at least 95% and optionally the carbon monoxide has a bio-content of at least 75% and preferably at least 95%.

17. The copolymer of claim 15, wherein the copolymer is formed into at least part of a sanitary product.

18. The copolymer of claim 15, wherein the copolymer is formed into a structural product.

* * * * *